(12) United States Patent
Okuma

(10) Patent No.: US 6,341,792 B1
(45) Date of Patent: Jan. 29, 2002

(54) TANK COVER ATTACHMENT STRUCTURE FOR MOTORCYCLE

(75) Inventor: Takanori Okuma, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/539,376

(22) Filed: Mar. 31, 2000

(30) Foreign Application Priority Data

Mar. 31, 1999 (JP) .......................................... 11-093387

(51) Int. Cl.$^7$ ................................................ B62J 35/00
(52) U.S. Cl. ...................... 280/304.3; 280/770; 280/835; 180/225
(58) Field of Search .............................. 280/304.3, 770, 280/833, 835; 180/219, 225; 296/136

(56) References Cited

U.S. PATENT DOCUMENTS

| | | | | |
|---|---|---|---|---|
| 4,347,909 A | * | 9/1982 | Takemura et al. | 180/219 |
| 4,629,201 A | * | 12/1986 | Tsukiji | 280/5 A |
| 4,712,637 A | * | 12/1987 | Mogi et al. | 180/219 |
| 5,012,883 A | * | 5/1991 | Hiramatsu | 180/225 |
| RE34,072 E | * | 9/1992 | Asakura | 180/68.3 |
| 5,145,023 A | * | 9/1992 | Tsurumi et al. | 180/68.1 |
| 5,172,788 A | * | 12/1992 | Fujii et al. | 180/219 |
| 6,105,701 A | * | 8/2000 | Buell | 180/229 |
| 6,213,514 B1 | * | 4/2001 | Natsume et al. | 280/833 |

FOREIGN PATENT DOCUMENTS

JP                6072372             3/2000

* cited by examiner

*Primary Examiner*—Avraham H. Lerner
(74) *Attorney, Agent, or Firm*—Birch, Stewart, Kolasch & Birch, LLP

(57) ABSTRACT

A tank cover attachment structure for a motorcycle includes a side portion of a fuel tank covered by tank covers and arranged behind a head pipe and linking the fuel tank and a seat, in that order. The support sections for the tank covers are provided on the seat and the fuel tank. By providing tank cover support sections on the seat, it is possible to directly attach the tank cover to a bottom plate of the seat, for example. Accordingly, it is possible to do away with components such as attachment stays, and it is possible to easily attach the tank cover.

22 Claims, 5 Drawing Sheets

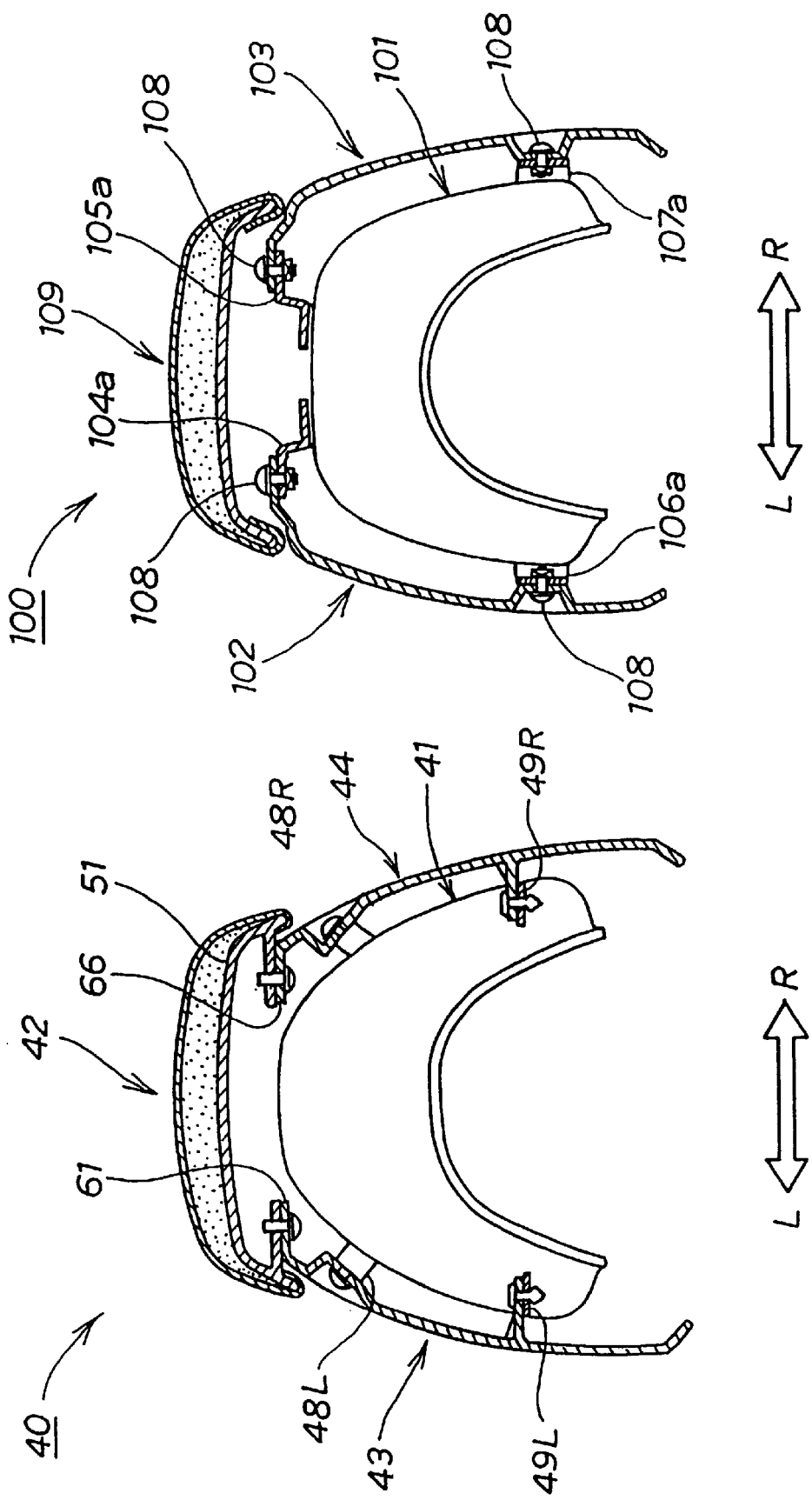
FIG. 4a EMBODIMENT
FIG. 4b COMPARATIVE EXAMPLE (a)

(b)

(c)

TANK COVER ATTACHMENT STRUCTURE FOR MOTORCYCLE

BACKGROUND OF THE INVENTION

1. Field of the Invention

The present invention relates to improvement to a tank cover attachment structure for a motorcycle.

2. Description of Background Art

A tank cover attachment structure for a motorcycle is disclosed in Japanese Patent laid-open No. Hei. 6-72372 wherein a fuel tank cover attachment structure for a motorcycle is set forth.

As shown in FIG. 3 and FIG. 4 of this publication, a cover front bracket 33, a cover lower bracket 34 and a cover upper bracket 35 are attached to a fuel tank 28, a cover bracket 41 is attached to a radiator 29 and through holes 37a and 37b are formed in a fuel tank cover 30. A detent projection 36a of the cover lower bracket 34 and a detent projection 36b of the cover upper bracket 36 respectively pass through the through holes 37a and 37b. The fuel tank cover 30 is fixed to the cover front bracket 33 using a screw 40a, while the fuel tank cover 30 is fixed to the cover bracket 41 of the radiator 29 using a screw 40b.

However, in the above described background art, in order to fix the fuel tank cover 30, the cover front bracket 33, the cover lower bracket 34 and the cover upper bracket 35 are attached beforehand to the fuel tank 28, and the cover bracket 41 must be fixed to the radiator 29, there are a lot of sections for attaching the fuel tank cover 30. Thus, attaching the fuel tank cover is complicated.

Also, since the cover front bracket 33, cover lower bracket 34 and cover upper bracket 35 are attached to the fuel tank 28 and the radiator 29 is attached to the cover bracket 41, differences in height occur between the respective brackets 33, 34, 35 and 41, and it is not possible to improve the precision of attaching the fuel tank cover.

SUMMARY AND OBJECTS OF THE INVENTION

The object of the present invention is to provide a tank cover attachment structure for a motorcycle that enables the tank cover to be attached simply and enables improved precision of attaching the tank cover.

In order to achieve the above described object, the tank cover attachment structure for a motorcycle according to the present invention has a side part of a fuel tank covered by a tank cover arranged behind a head pipe and linking the fuel tank and a seat, in that order, and support sections for the tank cover are provided on the seat and the fuel tank.

By providing tank cover support sections on the seat, it is possible to directly attach the tank cover to a bottom plate of the seat, for example. In addition, it is possible to attach the tank cover without components such as attachment stays, and it is possible to easily attach the tank cover. For example, by forming the fuel tank of resin or the like, and forming tank cover support sections integral with the resin type tank, it is possible to do without components such as attachment stays, and it is possible to easily attach the tank cover.

By integrally providing tank cover support sections on the seat and fuel tank in this way, the precision of attaching the tank cover can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4a illustrates the operation of the motorcycle tank cover attachment structure of the present invention;

FIG. 4b illustrates the operation of a comparative motorcycle tank cover attachment structure;

DETAILED DESCRIPTION OF THE PREFERRED EMBODIMENTS

Figure 1:
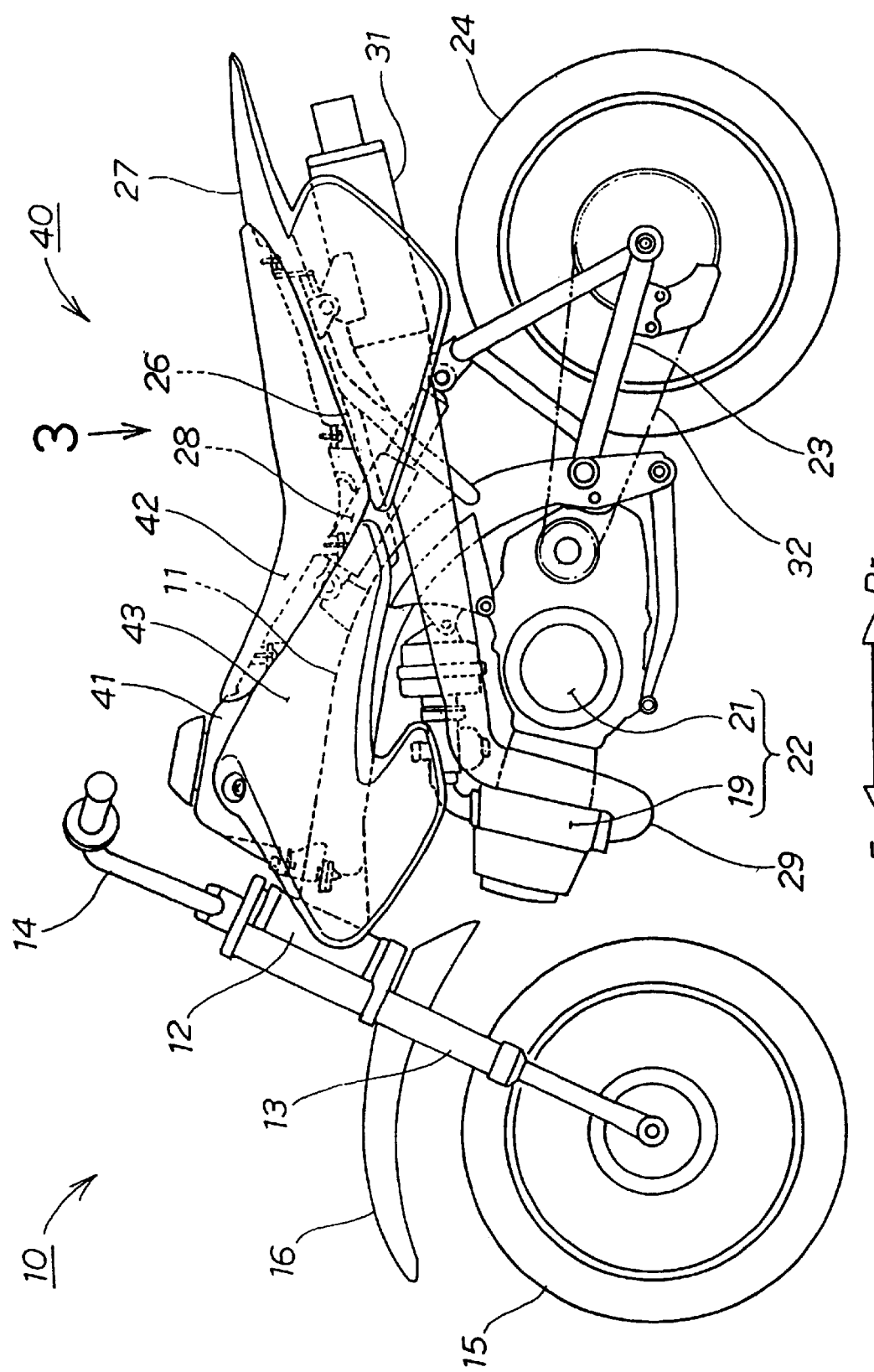
FIG. 1 is a side elevation of a motorcycle using the motorcycle tank cover attachment structure of the present invention.

Embodiments of the present invention will now be described based on the attached drawing. In the drawings, "front", "rear", "left", "right", "up" and "down" are directions as viewed by a rider, and reference numeral Fr represents a front wheel reference numeral Rr represents a rear wheel, L represents a left side, and R represents a right side.

FIG. 1 is a side elevation of a motorcycle using the motorcycle tank cover attachment structure of the present invention wherein a motorcycle 10 includes a vehicle frame 11, a head pipe 12 provided at a front section of the vehicle frame 11, front forks 13, 13 (the fork 13 at the far side is not shown in the drawing) rotatably attached to the head pipe 12. A handle bar 14 is attached to an upper part of the front forks 13, 13. A front wheel 15 is rotatably attached to a lower part of the front forks 13, 13. A front fender 16 is provided for covering the front wheel 15. A fuel tank 41 is attached to the vehicle frame 11 behind the head pipe 12. A seat 42 is provided behind the fuel tank 41. Left and right tank covers 43 and 44 (the far side tank cover 44 is not shown in the drawings) are supported on the fuel tank 41 and the seat 42. A power unit 22 is made up of an engine 19 and a transmission 21 arranged below the fuel tank 41 and the seat 42. A swingarm 23 is attached to the vehicle frame 11 behind the power unit 22 so as to be capable of rotating. A rear wheel 24 is rotatably attached to the swingarm 23 and driven by the power unit 22.

As illustrated in FIG. 1, a seat rail 26 is positioned adjacent to a seat cowl 27. A rear suspension 28 is disposed beneath the seat 42. An exhaust pipe 29 is connected to a silencer 31. A drive chain 32 is operatively connected to the power unit 22 and the rear wheel 24. A motorcycle tank cover attachment structure is generally referred to by numeral 40 (hereinafter abbreviated to tank cover attachment structure 40).

Figure 2:
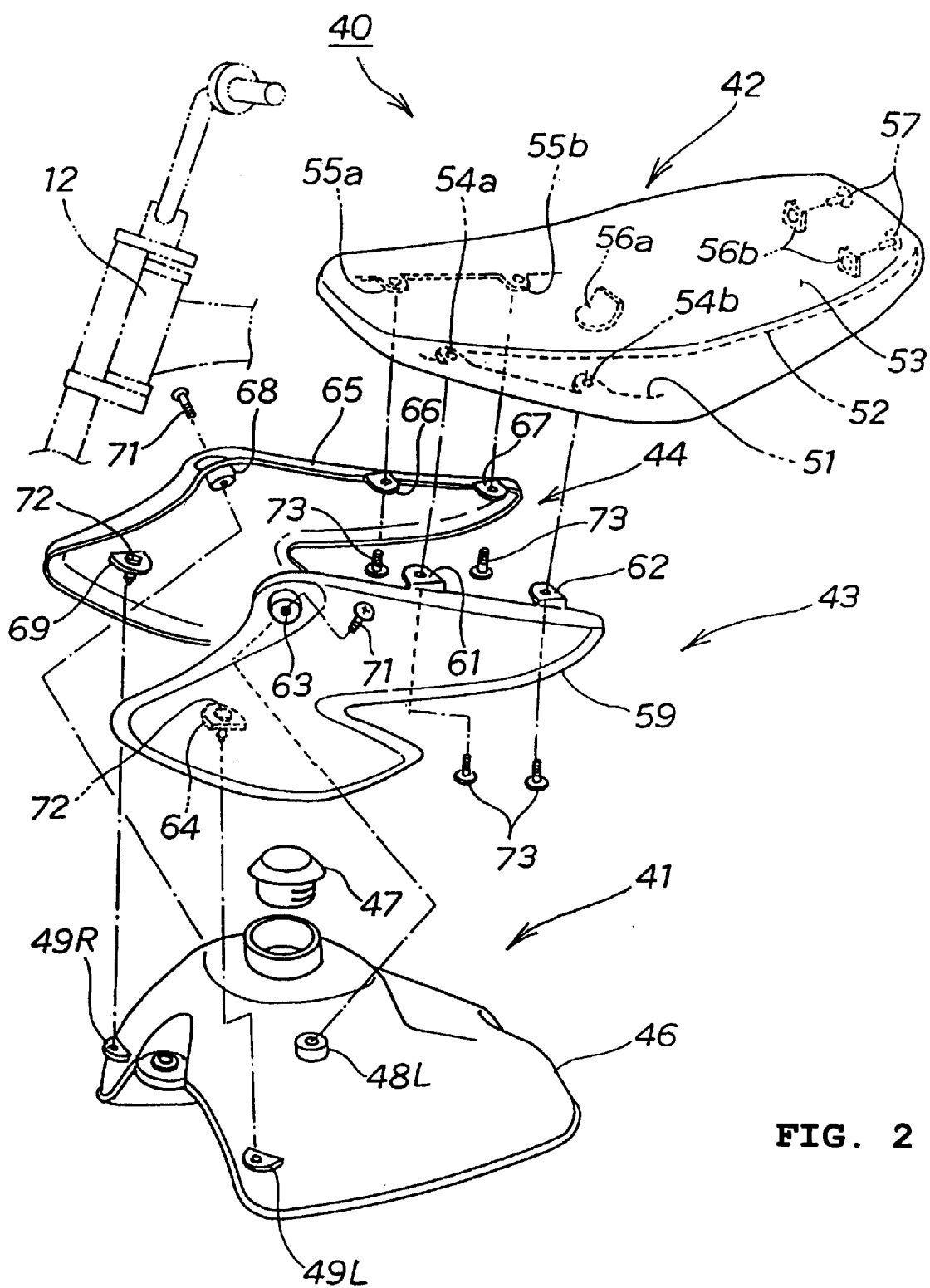
FIG. 2 is an exploded perspective view of the motorcycle tank cover attachment structure of the present invention.

FIG. 2 is an exploded perspective view of the motorcycle tank cover attachment structure of the present invention.

The tank cover attachment structure 40 includes a side portion of a fuel tank 41 covered by left and right tank covers 43 and 44 arranged behind a head pipe 12 and linking the fuel tank 41 and the seat 42, in that order, and support sections for the left and right tank covers 43 and 44 are provided on the seat 42 and the fuel tank 41.

The fuel tank 41 has a tank cap 47 fitting into a tank body 46, and has attachment bosses 48L and 48R (the right attachment boss 48R is not shown in the drawings) as support sections for attaching the left and right tank covers 43 and 44, and flange sections 49L and 49R as support sections integrally formed with the tank body 46. The fuel tank 41 is preferably made of resin to facilitate the integral formation of the attachment bosses 48L and 48R and the flange sections 49L and 49R.

The seat 42 has a cushion 52 attached to a base plate 51, and this cushion 52 is covered by a skin-like layer of material 53. The base plate 51 has a front support section 54a and a rear support section 54b as support sections for attachment of a left tank cover 43, and a front support section 55a and a rear support section 55b as support sections for attachment of a right tank cover 44.

A socket 56a is formed on the base plate 51 into which a seat rail 26 (refer to FIG. 1) is inserted, a stay section 56b is provided for attaching the seat rail 26. A seat attachment screw 57 is provided for attaching the seat rail 26 to the seat 42. More specifically, the seat 42 has a seat rail 26 which is inserted into the socket 56a and attached to the stay section 56b by the seat attachment screw 57.

The left tank cover 43 is wing-shaped, and has a outer first lug 61, a second outer lug 62, a first inner lug 63 and a second inner lug 64 formed on the tank cover body 59.

The right tank cover 44 is symmetrical to the left tank cover 43, and has first and second outer lugs 66 and 67 and first and second inner lugs 68 and 69 formed in the tank cover body 65.

Attachment screws 71, 71 are provided for attaching left and right tank covers 43 and 44 to the fuel tank 41. Fasteners 72, 72 are provided for attaching the left and right tank covers 43 and 44 to the fuel tank 41. A plurality of attachment screws 73 are provided for attaching the left and right tank covers 43 and 44 to the seat 42.

Figure 3:
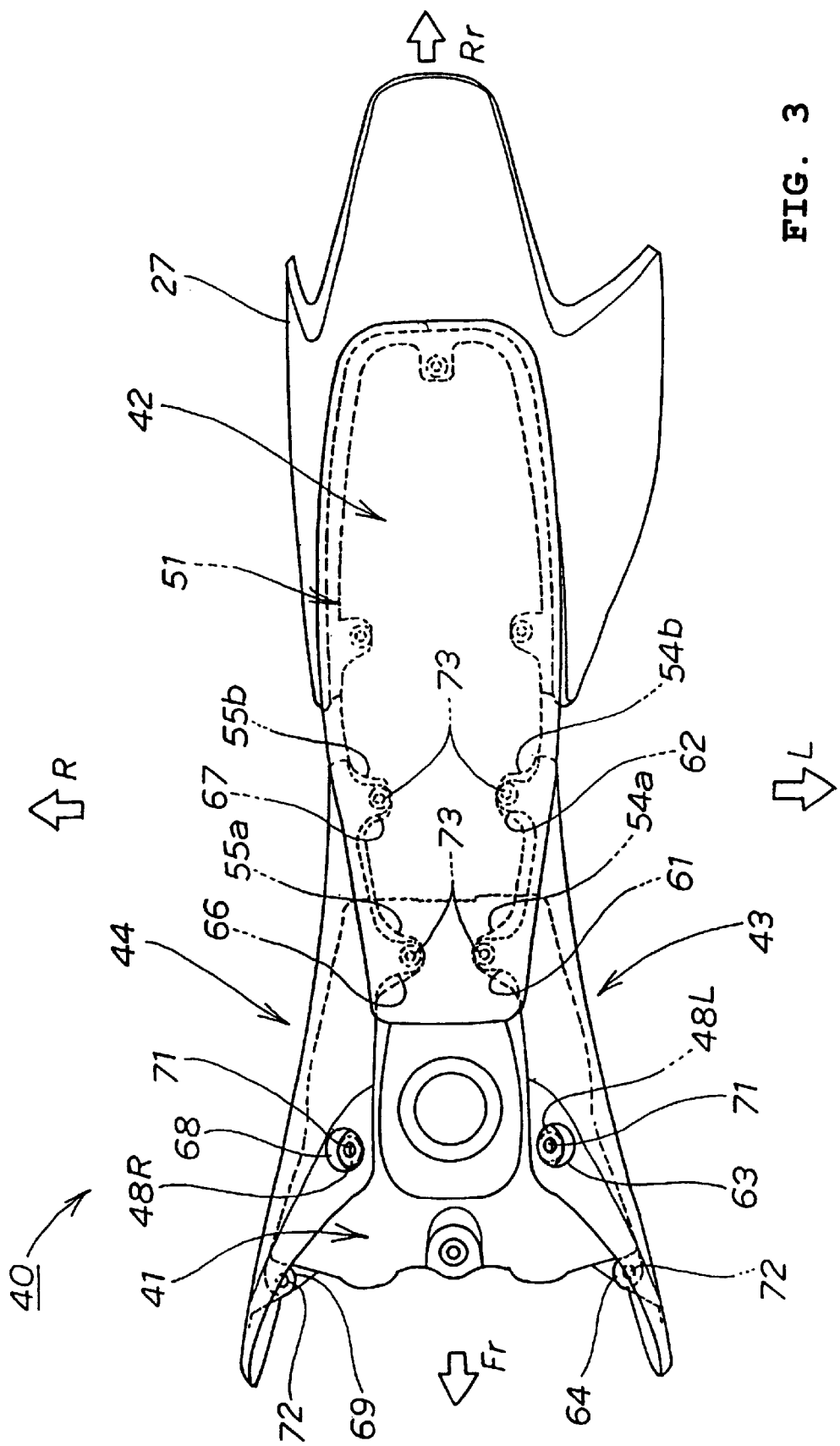
FIG. 3 is a drawing in the direction of arrow 3 in FIG. 1.

FIG. 3 illustrates the present invention as taken in the direction of arrow 3 in FIG. 1. FIG. 3 is a plan view showing the attachment structure of the left and right tank covers 43 and 44. The first outer lug 61 of the left tank cover 43 is attached to the front support section 54a of the seat 42 using an attachment screw 73. The second outer lug 62 is attached to the rear support section 54b of the seat 42 using an attachment screw 73. The first inner lug 63 is attached to the attachment boss 48L of the fuel tank 41 using an attachment screw 71 and the second inner lug 64 is attached to the flange section 49L (refer to FIG. 2) of the fuel tank 41 using a fastener 72.

Also, a first outer lug 66 of the right tank cover 44 is attached to the front support section 55a of the seat 42 using an attachment screw 73, the second outer lug 67 is attached to the rear support section 55b of the seat 42 using an attachment screw 73, the first inner lug 68 is attached to the attachment boss 48R of the fuel tank 41 using an attachment screw 71, and the second inner lug 69 is attached to the flange section 49R (refer to FIG. 2) of the fuel tank 41 using a fastener 72.

A seat cowl 27 is attached to the left and right tank covers 43 and 44 and the base plate 51 of the seat 42. That is, the left and right tank covers 43 and 44 and the seat cowl 27 are lifted together with the seat 42 by lifting the seat 42 upwards in the drawings.

The operation of the above described tank cover attachment structure will now be described. FIG. 4a and FIG. 4b illustrate the operation of the tank cover attachment structure for a motorcycle of the present invention. FIG. 4a shows the embodiment and FIG. 4b shows a comparative example.

In FIG. 4a, the tank cover attachment structure 40 of the embodiment has respective first and second outer lugs 61, 66, 62 and 67 (the second outer lugs 62 and 67 are not shown in the drawing) of the left and right tank covers 43 and 44 directly attached to the base plate 51 of the seat 42, which means that an attachment stay is no longer required. Also, by making the fuel tank of resin, as in the embodiment, it is possible to form support sections such as the attachment bosses 48L and 48R and the flange sections 49L and 49R integrally with the fuel tank 41, and there is no need to attach separate parts, which makes it possible to inexpensively manufacture the fuel tank 41.

In FIG. 4b, the tank cover attachment structure 100 of the comparative example has stays 104a, 104b, 105a and 105b (the stays 104b and 105b on the far side are not shown in the drawing) fixed to upper sections of the left and right tank covers 102 and 103 provided on the fuel tank 101, and stays 106a, 106b, 107a and 107b (the stays 106b and 107b on the far side are not shown in the drawing) fixed to lower sections of the left and right tank covers 102 and 103 also provided on the fuel tank 101, and the left and right tank covers 102 and 103 are attached by being fixed to these stays 104a, 104b, 105a 105b, 106a, 106b, 107a and 107b using attachment screws and covered by the seat 109.

The tank cover attachment structure 100 must be provided with, for example, four stays 104a, 104b, 105a and 105b for attaching the left tank cover 102 on the fuel tank 101, and the operation of attaching the stays 104a, 104b, 105a and 105b to the fuel tank 101 is complicated and it is not possible to reduce the cost.

Figure 5A:
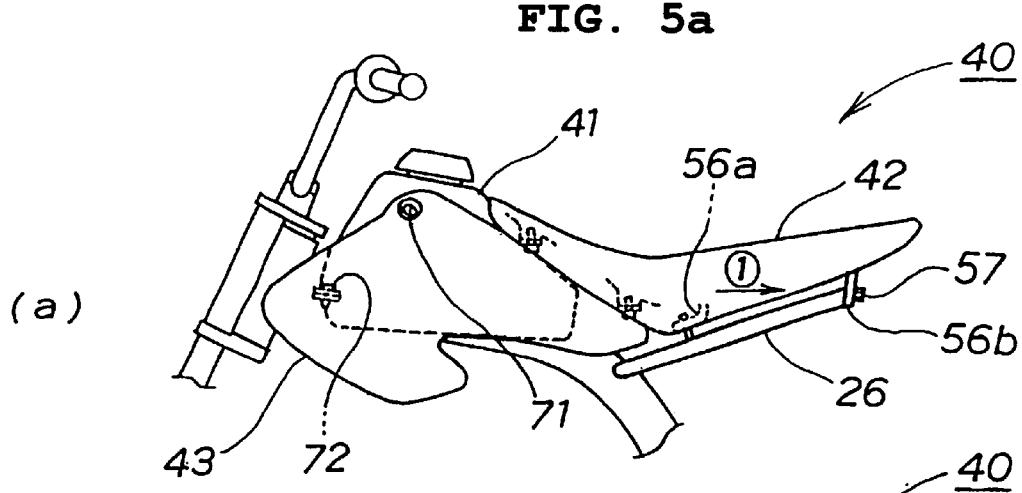
FIG. 5a illustrates the operation of the motorcycle tank cover attachment structure of the present invention as the motorcycle tank is connected to the motorcycle.
Figure 5B:
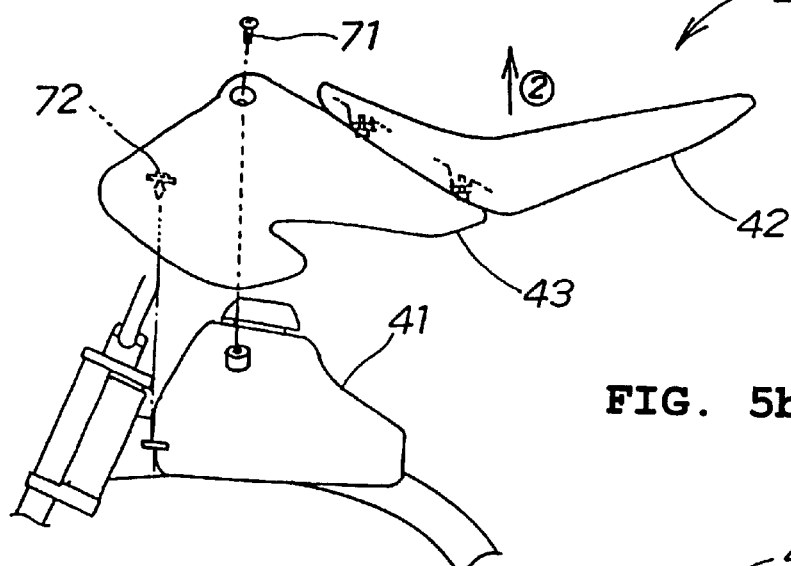
FIG. 5b illustrates the motorcycle tank cover attachment structure of the present invention as it is initially disconnected from the motorcycle.

FIG. 5a illustrates the operation of the tank cover attachment structure for a motorcycle of the present invention. FIG. 5b illustrates the removal of the left and right tank covers 43 and 44 (the right tank cover on the far side is not shown in the drawings).

In FIG. 5a, attachments screws 57, 57 (the attachment screw 57 on the far side is not shown) are removed from the seat rail 26, attachments screws 71, 71 (the attachment screw 71 on the far side is not shown) are removed from the fuel tank 41, and the fasteners 72, 72 (the fastener 72 on the far side is not shown) are removed from the fuel tank 41. The seat 42 is slid backwards in the direction of arrow 1 until the lug 56a comes away from the seat rail 26.

In FIG. 5b, the seat 42 is lifted up in the direction of arrow 2. The left and right tank covers 43 and 44 are also lifted together with the seat 42. For example, when removing the left and right tank covers in order to inspect the fuel tank 41, the attachment screws 71 are removed from the fuel tank 41, as shown in FIG, 5a, the fasteners 72 are removed from the fuel tank 41, and if the seat 42 is lifted up inspection of the fuel tank 41 is easy.

Figure 5C:
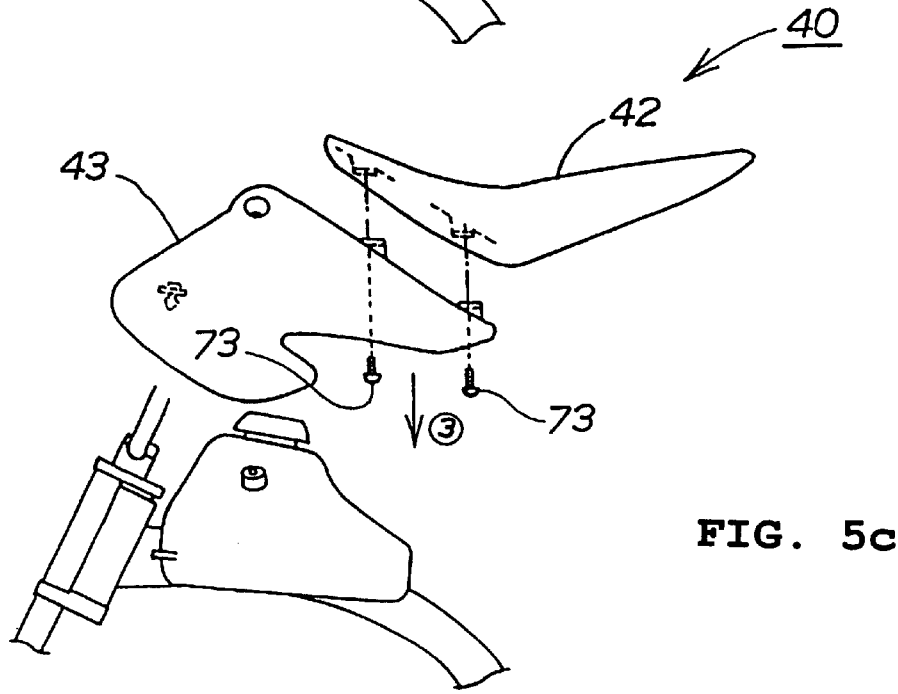
FIG. 5c illustrates the motorcycle tank cover attachment structure of the present invention as it is disconnected from the seat and the motorcycle.

In FIG. 5c, the attachment screws 73, 73 are removed from the seat 42 and the left and right tank covers 43 and 44 are removed from the seat 42 in the direction of arrow 3.

In this embodiment, as shown in FIG. 3, two support sections are provided on the side of the fuel tank and two support sections are provided in the side of the seat, but the present invention is not limited and any number of support sections may be provided.

The present invention provides tank cover support sections on a seat that are made possible, for example, to directly connect a tank cover to a base plate of a seat. As a result, it is possible to do away with components such as attachment stays and attachment of the tank cover is simplified. If the fuel tank is made of resin, for example, it is possible to do away with components such as attachment stays and to simplify the tank cover attachment by integrally forming the tank cover support sections on the resin tank.

In this way, by providing tank cover support sections integrally with the seat and the fuel tank it is possible to improve the accuracy of attaching the tank cover.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tank cover attachment structure for a motorcycle comprising:
   a fuel tank having a left side and a right side;
   tank covers for covering a side portion of the fuel tank, the tank covers are independent parts and located on the left side and right side of the fuel tank; and
   mounting means for linking the fuel tank and a seat, wherein support sections are provided on the seat and the fuel tank for mounting the tank covers thereto.

2. The tank cover attachment structure for a motorcycle according to claim 1, wherein said fuel tank includes an attachment boss for securing said tank covers to said fuel tank.

3. The tank cover attachment structure for a motorcycle according to claim 2, and further including a first flange section connected to said tank cover and a second flange section connected to said fuel tank, said first and second flange sections being selectively joined together for securing said tank cover to said fuel tank.

4. The tank cover attachment structure for a motorcycle according to claim 1, wherein said tank covers include lugs for securing said seat to said tank covers.

5. The tank cover attachment structure for a motorcycle according to claim 1, wherein said seat includes stay sections for securing said seat to a seat rail for supporting said seat relative to the motorcycle.

6. The tank cover attachment structure for a motorcycle according to claim 1, wherein said seat includes a stay section for securing said seat to a seat rail for supporting said seat relative to the motorcycle.

7. The tank cover attachment structure for a motorcycle according to claim 1, wherein said fuel tank includes a l eft side and a right side, said tank covers including a left cover positioned adjacent to the left side of said fuel tank and a right cover positioned adjacent to the right side of said fuel tank.

8. The tank cover attachment structure for a motorcycle according to claim 7, wherein said left cover includes a plurality of lugs for securing said seat to said left cover and said right cover includes a plurality of lugs for securing said seat to said right cover.

9. The tank cover attachment structure for a motorcycle according to claim 2, wherein said tank covers are secured to said attachment bosses by retaining means that are accessible from an outer surface of said tank covers for permitting removal of said tank covers from said fuel tank.

10. The tank cover attachment structure for a motorcycle according to claim 9, wherein said fuel tank includes a left side and a right side, said tank covers including a left cover positioned adjacent to the left side of said fuel tank and a right cover positioned adjacent to the right side of said fuel tank and wherein said left cover includes a plurality of lugs for securing said seat to said left cover and said right cover includes a plurality of lugs for securing said seat to said right cover, said seat being removable from said left and right covers after said tank covers are removed from said fuel tank.

11. The tank cover attachment structure for a motorcycle according to claim 1, wherein the tank covers substantially encloses the left and right sides of the fuel tank.

12. A tank cover attachment structure for a motorcycle comprising:
    a fuel tank having a left side and a right side;
    a left tank cover mounted on the left side of said fuel tank;
    a right tank cover mounted on the right side of said fuel tank, wherein said left and right tank cover substantially encloses the left and right sides of said fuel tank;
    a seat secured to said left tank cover and said right tank cover, said seat being removably mounted relative to said left tank cover and said right tank cover after said left tank cover and said right tank cover are disengaged from said fuel tank.

13. The tank cover attachment structure for a motorcycle according to claim 12, wherein said fuel tank includes an attachment boss for securing said left tank cover and said right tank cover to said fuel tank.

14. The tank cover attachment structure for a motorcycle according to claim 13, and further including a first left flange section connected to said left tank cover and a second left flange section connected to said fuel tank, said first and second left flange sections being selectively joined together for securing said left tank cover to said fuel tank and further including a first right flange section connected to said right tank cover and a second right flange section connected to said fuel tank, said first and second right flange sections being selectively joined together for securing said right tank cover to said fuel tank.

15. The tank cover attachment structure for a motorcycle according to claim 13, wherein said left tank cover and said right tank cover are secured to said attachment bosses by retaining means that are accessible from an outer surface of said left tank cover and said right tank cover for permitting removal of said left tank cover and said right tank cover from said fuel tank.

16. The tank cover attachment structure for a motorcycle according to claim 12, wherein said left tank cover and said right tank cover include lugs for securing said seat to said left tank cover and said right tank cover.

17. The tank cover attachment structure for a motorcycle according to claim 12, wherein said seat includes stay sections for securing said seat to a seat rail for supporting said seat relative to the motorcycle.

18. The tank cover attachment structure for a motorcycle according to claim 12, wherein said seat includes a stay section for securing said seat to a seat rail for supporting said seat relative to the motorcycle.

19. The tank cover attachment structure for a motorcycle according to claim 12, wherein said left tank cover includes a plurality of lugs for securing said seat to said left tank cover and said right tank cover includes a plurality of lugs for securing said seat to said right tank cover.

20. The tank cover attachment structure for a motorcycle according to claim 12, wherein the tank covers are independent parts.

21. The tank cover attachment structure for a motorcycle according to claims 12, wherein only one fuel tank is provided and wherein at least one of the left and right tank covers extends from a front edge to a rear edge of the fuel tank so that substantially all of the side of the fuel tank is covered.

22. The tank cover attachment structure for a motorcycle according to claim 12, wherein only one fuel tank is provided.

* * * * *